United States Patent
Kuk et al.

(10) Patent No.: US 9,352,255 B2
(45) Date of Patent: May 31, 2016

(54) SUCTION APPARATUS FOR FABRIC FILTER AND FILTERING DEVICE FOR LIQUID FILTRATION USING THE SAME

(75) Inventors: Younglong Kuk, Seoul (KR); Jaeku Kim, Seoul (KR)

(73) Assignee: ANT CORPORATION (KR)

( * ) Notice: Subject to any disclaimer, the term of this patent is extended or adjusted under 35 U.S.C. 154(b) by 668 days.

(21) Appl. No.: 13/596,508

(22) Filed: Aug. 28, 2012

(65) Prior Publication Data
US 2013/0048553 A1 Feb. 28, 2013

(30) Foreign Application Priority Data

Aug. 31, 2011 (KR) .................... 10-2011-0087580
Nov. 24, 2011 (KR) .................... 10-2011-0123413

(51) Int. Cl.
*B01D 25/32* (2006.01)
*B01D 29/39* (2006.01)
*B01D 29/68* (2006.01)
*B01D 33/21* (2006.01)
*B01D 33/48* (2006.01)
*B01D 33/50* (2006.01)
*B01D 29/66* (2006.01)

(52) U.S. Cl.
CPC ............. *B01D 33/21* (2013.01); *B01D 25/327* (2013.01); *B01D 29/39* (2013.01); *B01D 29/66* (2013.01); *B01D 29/68* (2013.01); *B01D 33/48* (2013.01); *B01D 33/503* (2013.01); *B01D 2201/082* (2013.01)

(58) Field of Classification Search
CPC .... B01D 25/327; B01D 25/386; B01D 29/66; B01D 33/21; B01D 33/15; B01D 33/23; B01D 33/073; B01D 33/48; B01D 33/44; B01D 33/50; B01D 33/503; B01D 33/74; B01D 33/745; B01D 2201/082; B01D 2201/083; B01D 2201/084; A47L 9/02; A47L 29/66
USPC ......... 210/333.01, 333.1, 391, 393, 402, 407, 210/411, 406, 413; 15/415.1
See application file for complete search history.

(56) References Cited

U.S. PATENT DOCUMENTS

| | | | | |
|---|---|---|---|---|
| 4,863,656 | A | * | 9/1989 | Hindstrom ......... B01D 39/2075 210/331 |
| 5,128,029 | A | * | 7/1992 | Herrmann ...................... 210/107 |
| 5,312,544 | A | * | 5/1994 | Kinney ......................... 210/107 |
| 5,855,799 | A | * | 1/1999 | Herrmann ...................... 210/780 |
| 6,103,132 | A | | 8/2000 | Seyfried et al. |
| 6,294,098 | B1 | | 9/2001 | Bergmann |

(Continued)

FOREIGN PATENT DOCUMENTS

EP 2060219 * 6/2008
WO WO 2009/128763 * 10/2009

OTHER PUBLICATIONS

Canadian Office Action dated Aug. 26, 2013, for CA 2,787,795.

*Primary Examiner* — Joseph Drodge
(74) *Attorney, Agent, or Firm* — Bacon & Thomas, PLLC (57) ABSTRACT

Provided are a suction apparatus for a fabric filter and a filtering device for liquid filtration using the same. A main suction slit and a sub-suction slit are provided in parallel by a partition. Thereby, pile threads undergo delayed straightening and fluctuation while going through the sub-suction slit and then are rapidly straightened in the main suction slit. Thus, a back-washing effect can be further improved.

10 Claims, 9 Drawing Sheets

(56) References Cited

U.S. PATENT DOCUMENTS 7,537,689 B2 * 5/2009 Ricketts ........................ 210/107
8,852,445 B2 * 10/2014 Xia et al. ...................... 210/791
2008/0011666 A1 * 1/2008 Baumann et al. ............. 210/411
2008/0035584 A1 * 2/2008 Petit et al. ..................... 210/780
2008/0040883 A1 * 2/2008 Beskow .................. A47L 5/225
15/329

* cited by examiner

SUCTION APPARATUS FOR FABRIC FILTER AND FILTERING DEVICE FOR LIQUID FILTRATION USING THE SAME

TECHNICAL FIELD

The present invention relates to a suction apparatus for a fabric filter and a filtering device for liquid filtration using the same, and more particularly, to a suction apparatus for a fabric filter and a filtering device for liquid filtration using the same, in which a main suction slit and a sub-suction slit are provided in parallel by a partition, so that pile threads undergo delayed straightening and fluctuation while going through the sub-suction slit and then are rapidly straightened in the main suction slit, and thus a back-washing effect can be further improved.

BACKGROUND ART

In general, fabric filters are designed to provide fibers (pile threads) on one surface of a disk-shaped filter, and to filtrate foreign materials when a pollutant such as polluted water passes through the disk-shaped filter.

Such a disk-shaped fabric filter is disclosed in Korean Patent No. 10-0424226 (Mar. 11, 2004). This filter is a filtering device for liquid filtration in which: a filter cloth is placed on a flow path of liquid to be filtrated and has pile threads 21 on its side exposed to a flow of the liquid; the length, strength and density of the pile threads are so calculated that the pile threads are laid flat by the flow of the liquid to be filtrated and form a deep filter with a plurality of angular, meandering flow passages; the filter cloth includes a suction bar 13 that has a suction slit 17 across the side of the filter cloth and suctions a back-washing flow through the filter cloth at a flow rate at which the pile threads are straightened so as to stand straight from the filter cloth when back-washed, and means for relatively moving the suction bar relative to the filter cloth 6 in a moving direction parallel to the filter cloth; the suction bar 13 at least has a surface 18 directed to the filter cloth 6 on the side of the suction slit 17 located in the front thereof with respect to the relative movement; and the surface faces the filter cloth 6 with a narrow gap and thus prevents the pile threads from being straightened by a mechanical action applied to the pile threads.

Particularly, this filtering device performs a back-washing action in which, as a disk-shaped filter piece 5 rotates with the suction bar 13 fixed, the straightening is delayed by the surface 18 of the suction bar 13 before the pile threads 21 reach the suction slit 17, and then is rapidly made when the pile threads 21 reach the suction slit 17, so that foreign materials trapped by the pile threads 21 in the filtration process are suctioned toward the suction bar 13.

However, this convention filtering device has a limitation of the back-washing effect, because the straightening of the pile threads is simply delayed by the surface 18 of the suction bar 13.

RELATED ART DOCUMENT

Patent Document

Patent Document 1: Korean Patent No. 10-0424226 (Mar. 11, 2004).

DISCLOSURE

Technical Problem

Accordingly, the present invention has been made keeping in mind the above problems occurring in the related art, and an object of the present invention is to provide a suction apparatus for a fabric filter and a filtering device for liquid filtration using the same, in which a main suction slit and a sub-suction slit are formed in parallel in a suction plate so as to be separated by a partition, so that pile threads undergo delayed straightening and fluctuation while going through the sub-suction slit and then are instantaneously straightened in the main suction slit, and thus a back-washing effect can be further improved.

Another object of the present invention is to provide a suction apparatus for a fabric filter and a filtering device for liquid filtration using the same, in which a main suction slit and a sub-suction slit are separated by a partition to remove foreign materials and be easily manufactured.

Another object of the present invention is to provide a suction apparatus for a fabric filter and a filtering device for liquid filtration using the same, in which a suction plate is formed by injection molding to be easily manufactured.

Technical Solution

To achieve these objects, according to an embodiment of the present invention, there is provided a suction apparatus for a fabric filter, which includes: a suction plate including a main suction slit having a length greater than a width and at least one sub-suction slit separated from the main suction slit by a partition, a width of the sub-suction slit being smaller than that of the main suction slit; and a suction body on which the suction plate is mounted.

According to another embodiment of the present invention, there is provided a suction apparatus for a fabric filter, which includes: a suction plate including a main suction slit and at least one sub-suction slit partitioned with a partition made of a metal material, a width of the sub-suction slit being smaller than that of the main suction slit; and a suction body on which the suction plate is mounted.

According to another embodiment of the present invention, there is provided a suction apparatus for a fabric filter, which includes: a suction plate including a main suction guide and at least one sub-suction guide, which are spaced apart from each other by a predetermined distance and protrude in one direction; and a suction body on which the suction plate is mounted.

Here, the suction plate may be formed by injection molding.

The two to five sub-suction slits may be formed so as to be parallel to each other.

The partition may have a stretched omega shape, and include flanges welded to inner walls of the suction body.

According to another embodiment of the present invention, there is provided a filtering device, which carries out filtration in a back-washing method using at least one suction apparatus. The filtering device includes at least one filter that has a plurality of pile threads on a surface thereof which is in direct contact with liquid to be filtrated and is rotatably installed for filtration. The suction apparatus is configured so that a suction plate includes a at least one sub-suction slit separated in parallel from a main suction slit by a partition, a width of the sub-suction slit being smaller than that of the main suction slit, and provided so as to face the surface of the filter so that pile threads undergo delayed straightening and fluctuation by liquid flowing from outside to inside the sub-suction slit while going through the sub-suction slit and then are rapidly straightened in the main suction slit.

Here, the filter may be a disk-shaped filter or a drum-shaped filter.

Finally, the suction apparatuses may be installed on the respective filters. The suction apparatus, the number of which is smaller than the number of filters installed on the filtering device, may be installed so as to be movable between the filters.

Advantageous Effects

According to the present invention, the suction apparatus for a fabric filter and the filtering device for liquid filtration using the same have the following effects.

1) A main suction slit and a sub-suction slit are formed in parallel in a suction plate so as to be separated by a partition, so that pile threads undergo delayed straightening and fluctuation while going through the sub-suction slit and then are instantaneously straightened in the main suction slit, and thus a back-washing effect can be further improved. That is, a back-washing synergy effect caused by the pile threads that are subjected to delayed straightening and then are instantaneously straightened in the main suction slit, and a back-washing effect caused by the pile threads that are fluctuated in the sub-suction slit are provided to easily back-wash foreign materials trapped on the pile threads when the liquid is filtrated.

2) Since an extent to which the pile threads are fluctuated can be adjusted according to an interval between the main suction slit and the sub-suction slit, an amount of fluctuation of the pile threads is previously determined based on this interval, so that the suction plate can be produced according to the determined result.

3) The suction plate is formed by injection molding, so that the suction apparatus can easily produced in a simple structure and various forms.

DESCRIPTION OF DRAWINGS

FIG. 8 shows a mounted state of the suction plate according to the fourth embodiment of the present invention, wherein

MODE FOR INVENTION

Hereinafter, exemplary embodiments of the present invention will be described with reference to the accompanying drawings. Prior to the description, the terms or words used in the specification and claims should not be interpreted as being limited to ordinary or lexical meaning. Rather, they should be interpreted as the meanings and the concepts according to the idea of the present invention, abiding by the principle that an inventor can properly define the conception of terms so as to describe his/her own invention in the best manner.

Accordingly, the configuration illustrated in the embodiments disclosed herein and in the drawings is merely the most preferred embodiment of the present invention, and is not intended to represent all the technical spirit of the present invention, and thus it should be understood that there may exist various equivalents and modifications for substituting those at the time of filing this application.

First Embodiment

Figure 1:
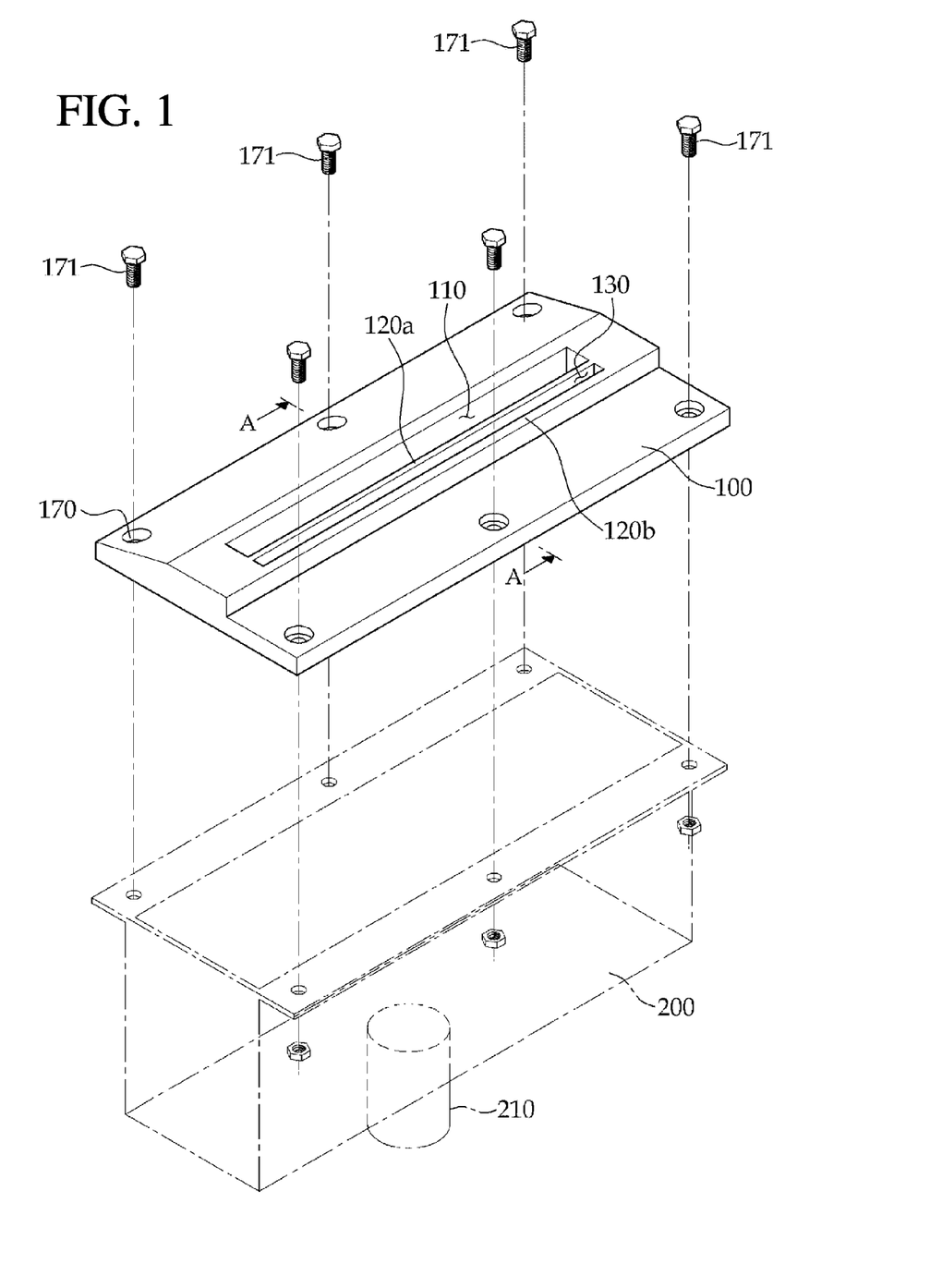
FIG. 1 is an exploded perspective view showing the overall configuration of a suction apparatus according to a first embodiment of the present invention.
Figure 2:
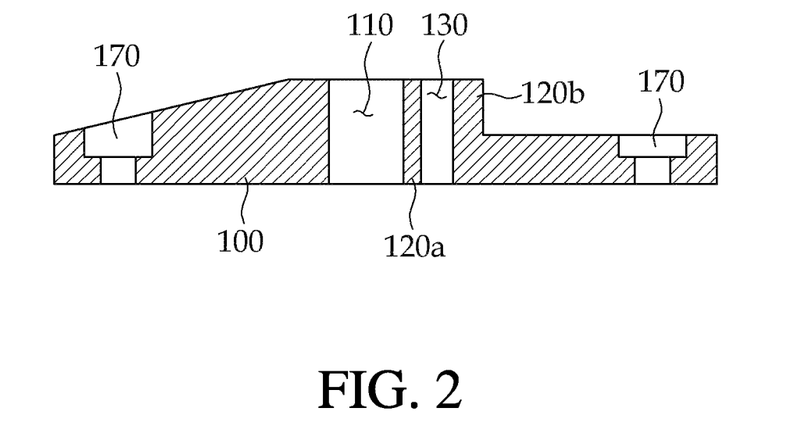
FIG. 2 is a cross-sectional view showing a suction plate according to the first embodiment of the present invention.

FIG. 1 is an exploded perspective view showing the overall configuration of a suction apparatus according to a first embodiment of the present invention. FIG. 2 is a cross-sectional view showing a suction plate according to the first embodiment of the present invention. FIG. 3 is a cross-sectional view showing an operation of the suction apparatus according to the first embodiment of the present invention. Among the symbols in the figures, "D" indicates a disk-shaped filter, and "F" indicates pile threads provided on one surface of the disk-shaped filter.

The suction apparatus according to the first embodiment of the present invention includes a suction plate 100 that substantially suctions foreign materials, and a suction body 200 that applies a suction force to the suction plate 100 and discharges the suctioned foreign materials.

In detail, the suction plate 100 has a main suction slit 110 and a sub-suction slit 130 partitioned with a partition 120a. Pile threads F pass through the sub-suction slit 130, and a flow of liquid suctioned from the outside to the inside of the sub-suction slit 130 delays straightening of the pile threads F and causes fluctuation of the pile threads F. Thereby, foreign materials can be easily separated.

To remove foreign materials, the suction apparatus of the present invention may be mounted on one surface of a disk-shaped filter, or on an outer circumference of a drum-shaped filter in a longitudinal direction. Further, the suction apparatus may be mounted on any filter, to an outer surface of which the pile threads F are provided. However, for the convenience of description, the disk-shaped filter D will be described by way of example.

Hereinafter, the foregoing components will be described in greater detail.

The suction plate 100 is a planar member having a predetermined thickness and has the main suction slit 110 formed in a longitudinal direction. Here, a length of the main suction slit 110 is determined in consideration of the radius of the disk-shaped filter D for removing foreign materials. A width of the main suction slit 110 is set so that the pile threads F can be suctioned and stretched by suction inside the suction plate 100.

Further, the suction plate 100 has the sub-suction slit 130. The sub-suction slit 130 is separated from the main suction slit 110 by the partition 120a. In detail, the sub-suction slit 130 is configured so that both sides thereof are formed parallel to the longitudinal direction by the partitions 120 and 120b. Thereby, straightening of the pile threads F is preferably delayed by the suctioned liquid passing through the sub-suction slit 130 while the pile threads F go over the partitions 120 and 120b.

Here, a width of the sub-suction slit 130 is set to be smaller than that of the main suction slit 110.

The suction plate 100 may be further provided with mounting holes 170 along both edges thereof parallel to the longitudinal direction. Fixing means 171 such as screws or bolts are fitted into the mounting holes 170 when the suction plate 100 is mounted on the suction body 200 as described below.

The suction body 200 is a kind of container, and is mounted on the other (or rear) surface of the suction plate 100 in order to provide a suction force to the suction plate 100.

The suction body 200 is provided with a connector 210 on a sidewall or a bottom thereof, to which suction means (not shown) such as a pump can be connected.

In the first embodiment of the present invention, the suction plate 100 and the suction body 200 have been described as being separately produced and assembled in one body. However, the suction plate 100 and the suction body 200 may be integrally produced at once by injection molding.

Further, the sub-suction slit 130 has been illustratively described so that the number thereof is one. However, at least one sub-suction slit may be formed. For example, one to five sub-suction slits may be formed depending on the length of the pile threads F.

The suction apparatus for a fabric filter according to the first embodiment of the present invention is operated as follows. In FIG. 3, curved arrows indicate moving paths of the liquid and the foreign materials suctioned when back-washing is performed, and a linear arrow indicates moving direction of a disk-shaped filter. For the convenience of description, a delayed straightening operation of one pile thread F and a fluctuating operation of one pile thread F are described.

First, as in FIG. 3(*a*), the disk-shaped filter D moves up, and thus the pile thread F moves up.

Next, when the disk-shaped filter D is further rotated, the pile thread F is suctioned toward the suction plate 100 by a suction force of liquid suctioned into the sub-suction slit 130, as in FIG. 3(*b*). That is, the straightening of the pile thread F is delayed until the pile thread F reaches the main suction slit 110.

Figure 3A:
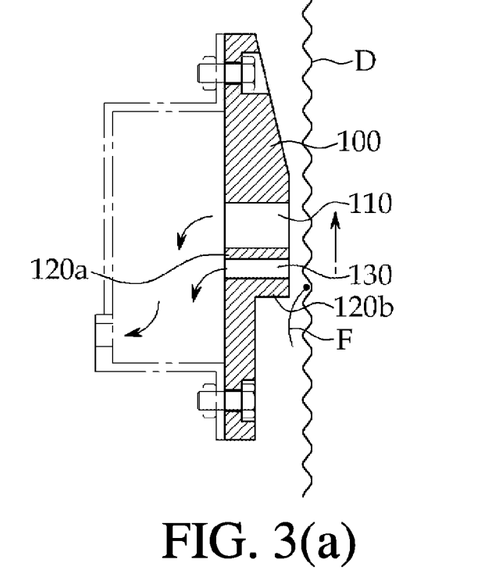
FIG. 3 is a cross-sectional view showing an operation of the suction apparatus according to the first embodiment of the present invention.
Figure 3B:
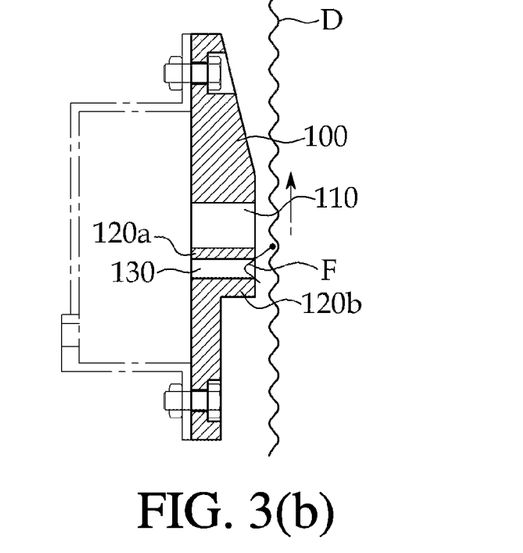
Figure 3C:
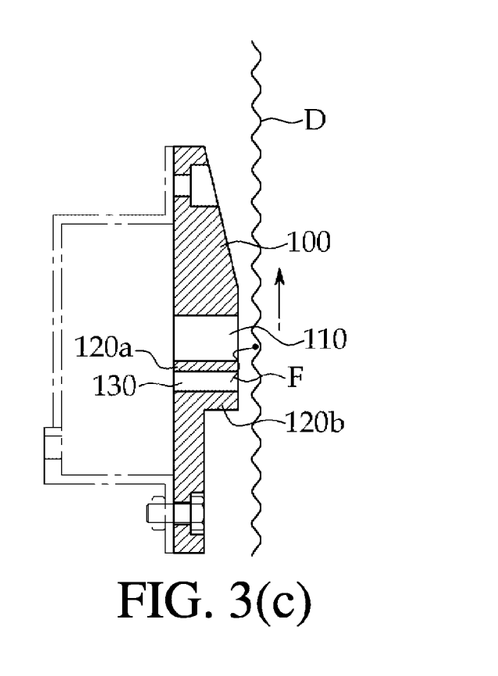

As the disk-shaped filter D is still further rotated, the pile thread F begins to fluctuate toward the disk-shaped filter D due to interference with the partition 120*a*.

Figure 3D:
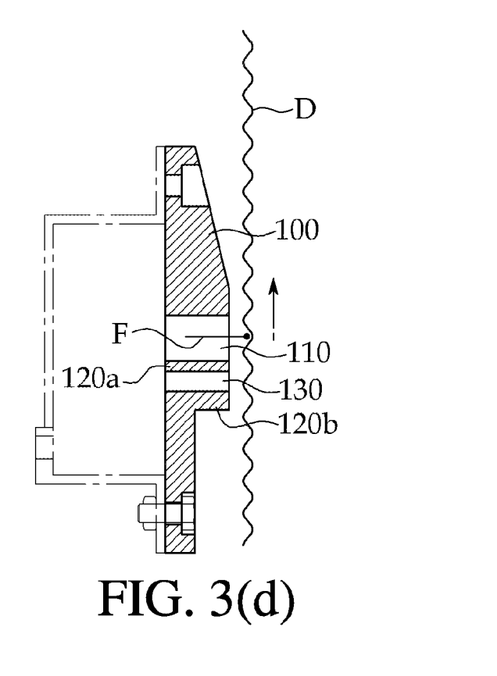

Finally, the pile thread F goes over the partition 120*a* and then is straightly stretched rapidly in the main suction slit 110. Foreign materials trapped by pile thread F when the liquid is filtered are suctioned toward the suction body 200.

This delayed straightening effect according to the present invention is improved over the surface-based delayed straightening effect according to the related art.

The straightening of the pile thread F is delayed, and simultaneously the suction force of the liquid suctioned toward the sub-suction slit 130 is applied to the pile thread F before the pile thread F reaches the main suction slit 110. As such, the pile thread F is fluctuated, and the foreign materials trapped by the pile thread F when the liquid is filtered are more efficiently suctioned toward the suction body 200.

Second Embodiment

Figure 4:
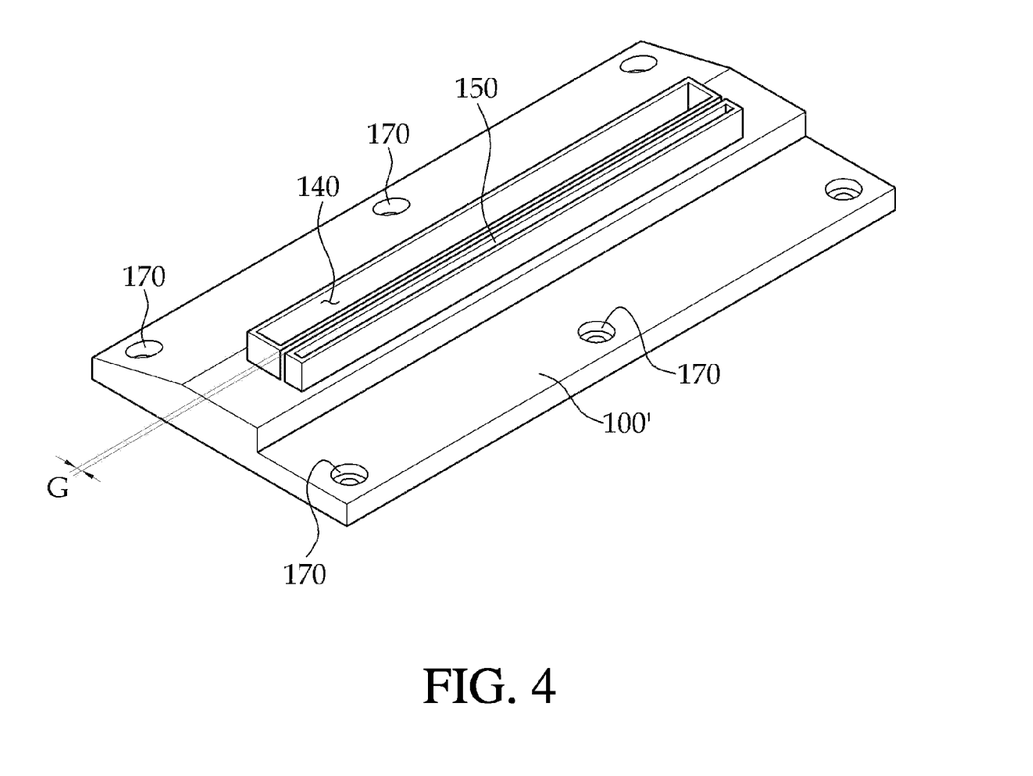
FIG. 4 is a perspective view showing the configuration of a suction plate according to a second embodiment of the present invention.

FIG. 4 is a perspective view showing the configuration of a suction plate according to a second embodiment of the present invention. Here, the same symbol is used for the same configuration as the first embodiment, and its detailed description will be omitted.

A suction apparatus according to the second embodiment of the present invention has a difference in configuration of the suction plate 100', compared to that according to the first embodiment.

That is, the suction plate 100' includes a main suction guide 140 and a sub-suction guide 150 so that pile threads F can undergo delayed straightening and fluctuation. Here, the main suction guide 140 and the sub-suction guide 150 are a kind of slit that enables suction of the pile threads F. The main suction guide 140 is spaced apart from the sub-suction guide 150 by a predetermined distance G.

The delayed straightening and fluctuation effects of the suction plate 100' are the same as in the first embodiment, and thus their detailed descriptions will be omitted.

Like the sub-suction slit 130 of the first embodiment, the sub-suction guide 150 of the second embodiment may also be formed so that its number is at least one.

Third Embodiment

Figure 5:
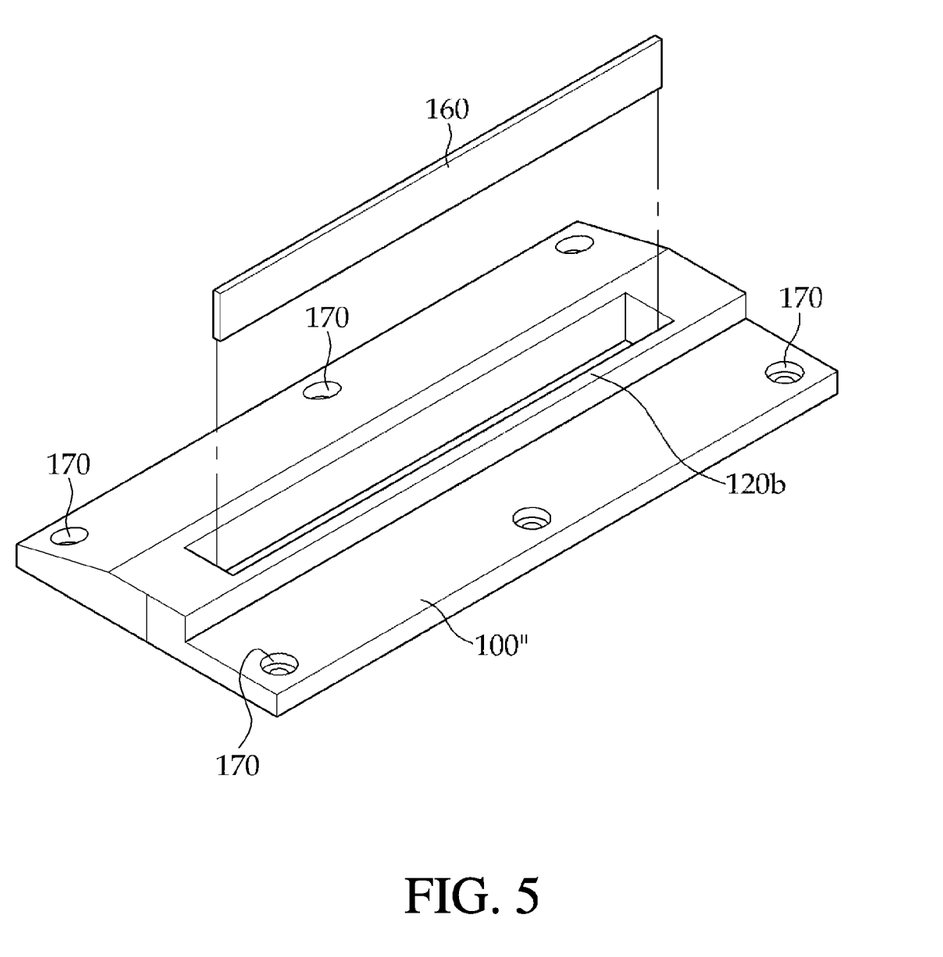
FIG. 5 is a perspective view showing the configuration of a suction plate according to a third embodiment of the present invention.
Figure 6:
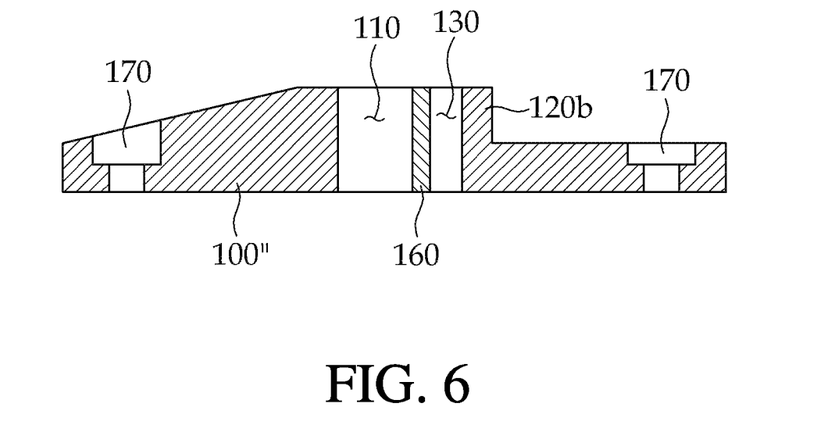
FIG. 6 is a cross-sectional view showing the configuration of the suction plate according to the third embodiment of the present invention.

FIG. 5 is a perspective view showing the configuration of a suction plate according to a third embodiment of the present invention. FIG. 6 is a cross-sectional view showing the configuration of the suction plate according to the third embodiment of the present invention. The same symbol is used for the same configuration as the first embodiment, and its detailed description will be omitted.

A suction apparatus according to the third embodiment of the present invention has a difference in configuration of the suction plate 100", compared to that according to the first embodiment.

The suction plate 100" of the third embodiment uses a partition 160 in forming a main suction slit 110 and a sub-suction slit 130. Here, as the partition 160, a metal plate such as a steel plate may be used. Since the steel plate can be formed so as to have an arbitrary thickness, i.e. a desired thickness, the partition can be formed so as to easily adjust a rotational range of the pile threads F.

A width of the sub-suction slit 130 is smaller than that of the main suction slit 110.

Further, when the suction plate 100" is made of a metal material, the partition 160 may be integrally formed by a coupling method such as welding. When the suction plate 100" is made of plastic, the partition 160 may be integrally formed by a coupling method such as injection molding.

Fourth Embodiment

Figure 7:
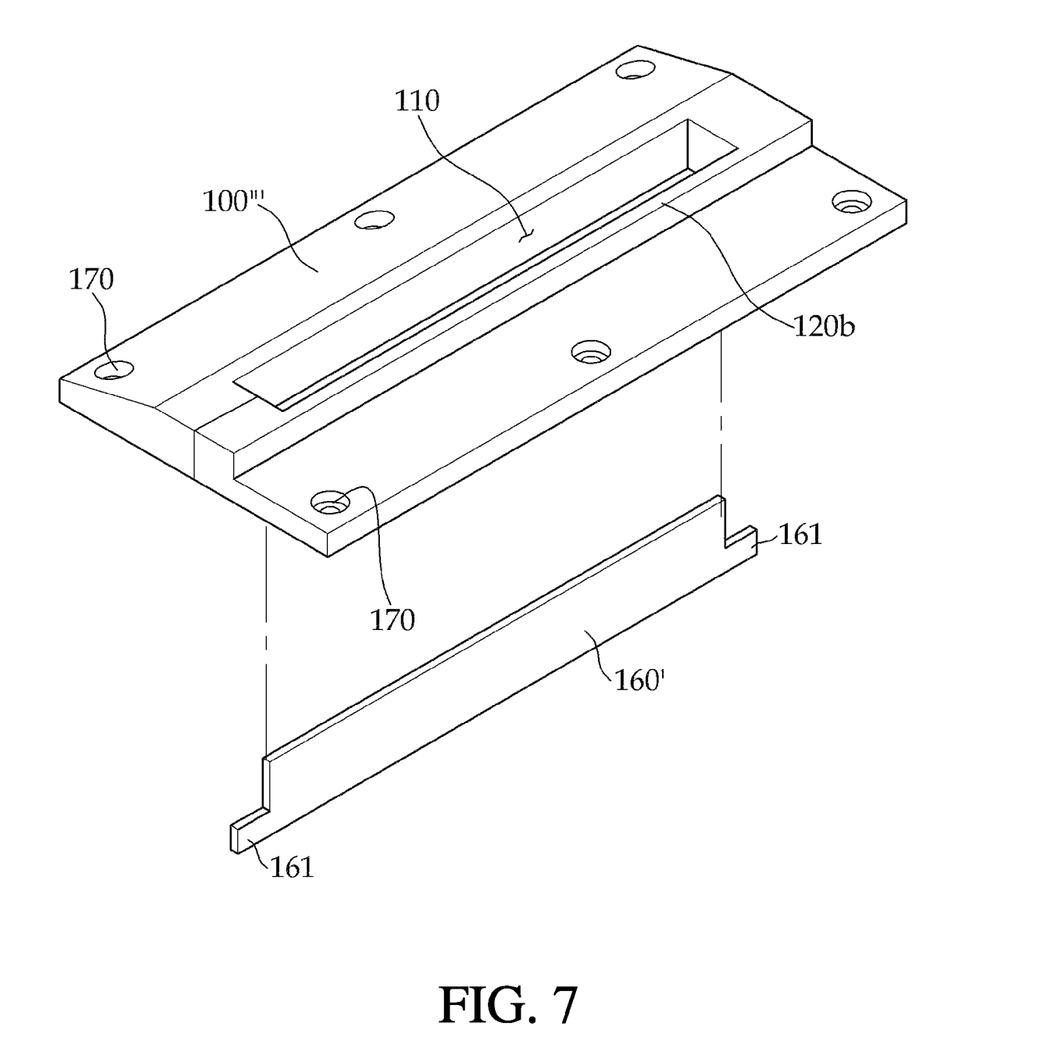
FIG. 7 is an exploded perspective view showing the configuration of a suction plate according to a fourth embodiment of the present invention.
Figure 8A:
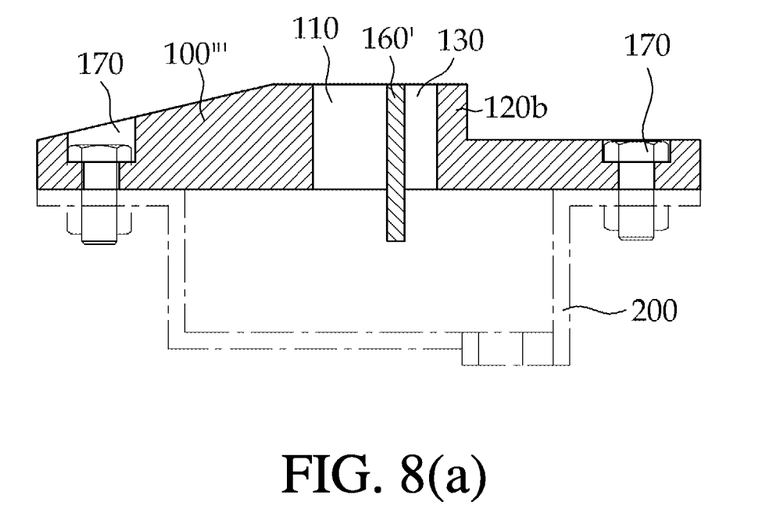
FIG. 8(a) is a side cross-sectional view and FIG. 8(b) is a front cross-sectional view.
Figure 8B:
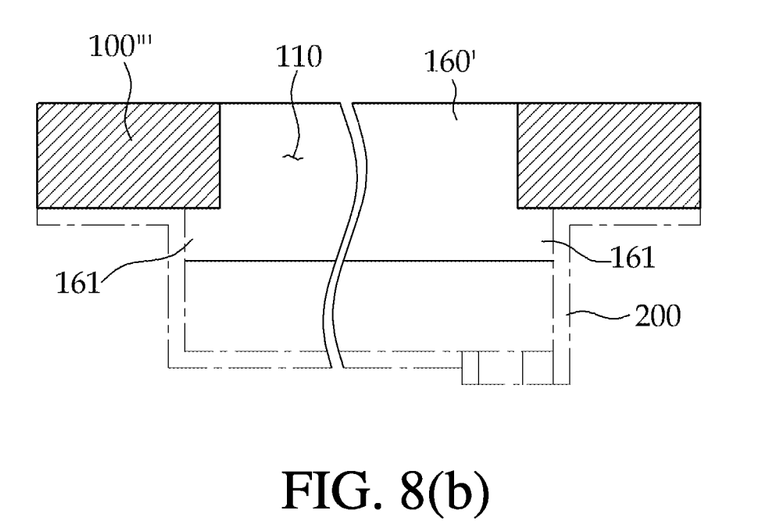

FIG. 7 is an exploded perspective view showing the configuration of a suction plate according to a fourth embodiment of the present invention. FIG. 8 shows a mounted state of the suction plate according to the fourth embodiment of the present invention, wherein FIG. 8(*a*) is a side cross-sectional view and FIG. 8(*b*) is a front cross-sectional view. The fourth embodiment is modified from the third embodiment. The same symbol is used for the same configuration as the third embodiment, and its detailed description will be omitted.

The suction plate 100''' according to the fourth embodiment is configured so that opposite ends of a partition 160' can be welded to a suction body 200.

In detail, the partition 160' is formed in a stretched omega shape. Here, an upper portion of the partition 160' is formed so that a length thereof is the same as a main suction slit 110. This is intended to fit the upper portion into the main suction slit 110, and to allow the main suction slit 110 to be partitioned into two slits: a main suction slit and a sub-suction slit.

Further, the upper portion of the partition 160' may be formed so that the length thereof is slightly longer than that of the main suction slit 110. This is intended to provide grooves (not shown) to respective inner surfaces of the main suction slit 110, to fit the expanded opposite ends of the upper portion into the grooves, and to prevent the partition 160' from being vibrated or bent by a hydraulic pressure.

Further, a lower portion of the partition 160' is integrally formed so that opposite ends thereof protrude outwardly to form flanges 161. Particularly, the flanges 161 are installed on the bottom of the suction plate 100''' so as to protrude toward the inside of a suction body 200. Ends of the flanges 161 are fixed to the suction body 200 by a coupling method such as welding.

The partition 160' configured in this way is previously welded to the suction body 200 at predetermined positions, and then the suction body 200 is coupled to the suction plate 100'''.

In the fourth embodiment, the partition 160' has been described as being formed in the stretched omega shape because a length of the main suction slit 110 is shorter than an inner length of the suction body 200. However, if the length of the main suction slit 110 is the same as the inner length of the suction body 200, it can be readily understood that the partition 160' is also formed in a rectangular shape.

Filtering Device

Figure 9:
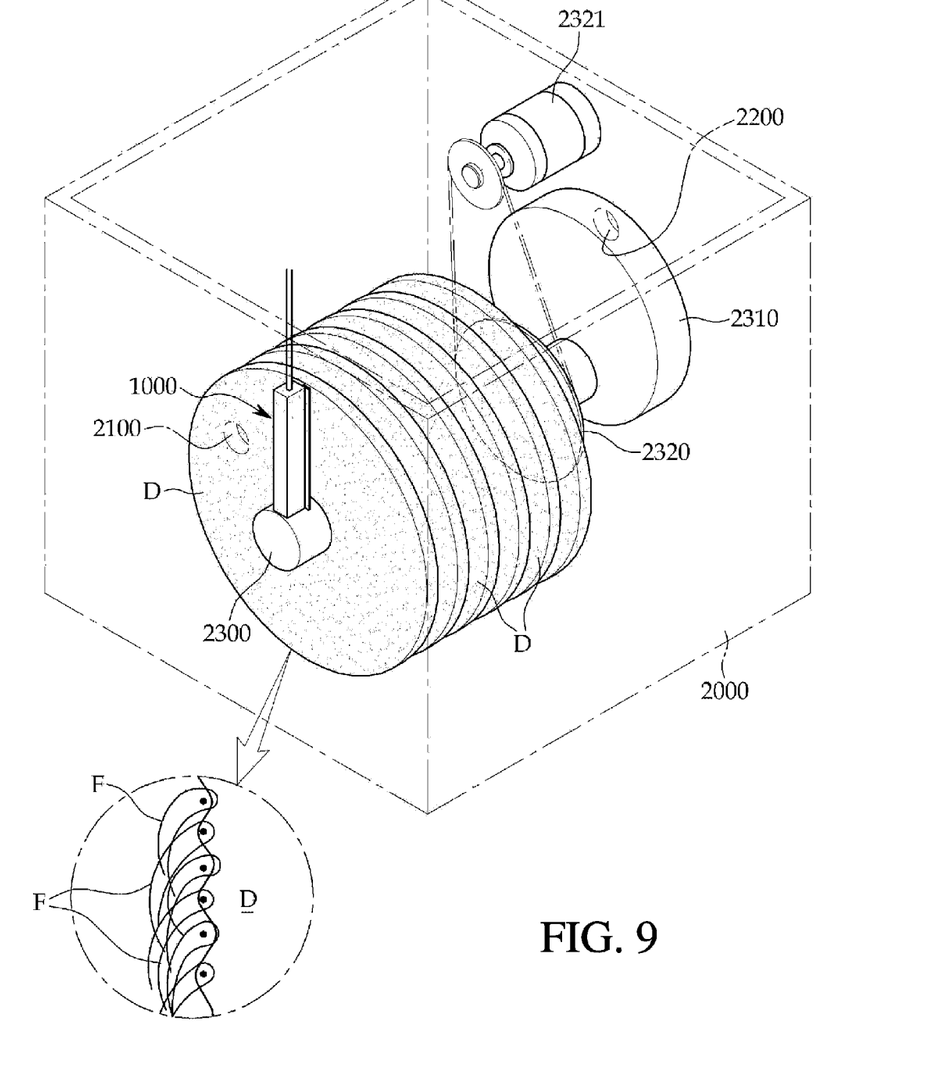
FIG. 9 is a perspective view showing an example of a filtering device having a suction apparatus according to the present invention.

FIG. 9 is a perspective view showing an example of a filtering device having a suction apparatus according to the present invention.

The filtering device according to the present invention includes a filter having a plurality of pile threads F for filtration on a surface that is in direct contact with liquid to be filtrated. A suction apparatus 1000 according to the present invention is installed so as to face the filter to allow the liquid to be suctioned in a direction opposite to a direction in which the liquid is penetrated.

Particularly, the suction apparatus 1000 is configured to remove foreign materials based on a back-washing method of suctioning liquid in a direction opposite to a direction in which the liquid flows when filtrated, again straightening pile threads F that are laid flat, and washing the filter.

Hereinafter, the configuration of the filtering device will be described in greater detail.

The filtering device according to the present invention includes a housing 2000 that contains the liquid to be filtrated. The housing 2000 is provided with an inlet 2100 into which liquid is fed on one side thereof and an outlet 2200 through which the filtrated liquid is discharged.

Further, the housing 2000 is provided therein with a hollow recovery pipe 2300. Particularly, the recovery pipe 2300 is rotatably installed, and is connected so as to communicate with the outlet 2200. It is shown in the figure that the recovery pipe 2300 and the outlet 2200 are connected via an auxiliary pipe 2310. To rotate the recovery pipe 2300, a sprocket 2320 is installed on the recovery pipe 2300 and is driven by a motor 2321.

The recovery pipe 2300 is provided with at least one filter for filtrating liquid. As an available filter, any filter may be used if pile threads F are provided to its outer surface. Herein, a disk-shaped filter D is preferably used.

The disk-shaped filter D refers to a filter having a disk shape. A plurality of disk-shaped filters D is mounted around the recovery pipe 2300. These disk-shaped filters D communicate with the recovery pipe 2300, thereby discharging the filtrated liquid to the outside of the filtering device through the recovery pipe 2300.

Each disk-shaped filter D has the pile threads F for filtration on its surface.

The suction apparatus 1000 for the back-washing is mounted on the disk-shaped filter D configured in this way. For the suction apparatus 100, the foregoing various embodiments may be applied.

Here, the suction apparatus 1000 is configured so that the suction plate is mounted so as to face the disk-shaped filter D. The suction apparatus 1000 is used in contact with or in close vicinity to the pile threads F laid flat on the surface of the disk-shaped filter D.

Further, the suction apparatus 1000 is configured so that, when the disk-shaped filter D is rotated, the pile threads F go through the sub-suction slit and then the main suction slit. Thereby, as in FIG. 3, when the pile threads F go through the sub-suction slit 130, the pile threads are delayed in straightening and are exposed to fluctuation. As a result, the foreign materials can be easily separated.

This suction apparatus 1000 is preferably installed so that a longitudinal direction thereof is set to a radial direction of the disk-shaped filter D, and so that, as the disk-shaped filter D rotates, the suction can be performed on the entire surface of the disk-shaped filter D.

Alternatively, the disk-shaped filter D may be fixed, and the suction apparatus 1000 may be rotated.

In the exemplary embodiment of the present invention, the suction apparatus 1000 may be installed on each of the disk-shaped filters D.

Further, the suction apparatuses 1000 may be configured so that the number thereof is one or smaller than the number of disk-shaped filters D, and may carry out filtration while moving between the other disk-shaped filters D.

Finally, in the filtering device according to the exemplary embodiment of the present invention, the suction apparatus 1000 according to the foregoing various embodiments may be applied. Thus, it can be apparent to a person skilled in the art that a variety of filtering devices can be made.

DESCRIPTION OF REFERENCE NUMERALS 100, 100', 100'': suction plate
110: main suction slit
120a, 120b: partition
130: sub-suction slit
140: main suction guide
150: sub-suction guide
160: partition
170: mounting hole
171: mounting means
200: suction body
210: connector

What is claimed:

1. A suction apparatus for a fabric filter, comprising:
a suction plate (100) having a main suction slit (110) having a length greater than a width and at least one sub-suction slit (130) located adjacent to a longitudinal side of the main suction slit in a parallel direction and separated from the main suction slit (110) by a first partition (120a), the first partition extending the length of the main suction slit in a parallel direction and spacing a longitudinal side of the at least one sub-suction slit away from the longitudinal side of the main suction slit, a width of the sub-suction slit (130) being smaller than that of the main suction slit (110), wherein a second partition is formed by a stepped surface of the suction plate at an opposite longitudinal side of the sub-suction slit, the second partition extending the length of the sub-suction slit in a parallel direction, and wherein the width of the main suction slit is uniform along the longitudinal direction and the width of the sub-suction slit is uniform along the longitudinal direction; and
a suction body (200) on which the suction plate (100) is mounted.

2. The suction apparatus according to claim 1, wherein the suction plate (100, 100', 100'') is formed by injection molding.

3. The suction apparatus according to claim 1, wherein the at least one sub-suction slit comprises two to five sub-suction slits (130) that are formed so as to be parallel to each other.

4. A filtering device, which carries out filtration during back-washing comprising at least one suction apparatus (1000) as recited in claim 1, the filtering device comprising:
at least one filter that has a plurality of pile threads (F) on a surface thereof which is in direct contact with liquid to be filtrated and is installed for filtration,
wherein the suction apparatus (1000) is configured so that the suction plate (100) which includes at least one sub-suction slit (130) separated in parallel from a main suction slit (110) by a partition, a width of the sub-suction slit being smaller than that of the main suction slit, is provided so as to face the surface of the filter, the suction apparatus and filter surface being relatively moveable, so that the pile threads (F) undergo delayed straightening and fluctuation by liquid flowing from outside the sub-suction slit to inside the sub-suction slit (130) and then are rapidly straightened by liquid moving through the main suction slit (110), during relative movement of the filter surface with respect to the suction plate.

5. The filtering device according to claim 4, wherein the filter is a disk-shaped filter or a drum-shaped filter.

6. The filtering device according to claim 4, wherein the suction apparatus (1000) is installed on each filter.

7. The filtering device according to claim 4, wherein the suction apparatus (1000) is installed so as to be movable between the filters.

8. A suction apparatus for a fabric filter, comprising:
a suction plate (100") having a main suction slit (110), at least one sub-suction slit (130), a first partition and a second partition, wherein the main suction slit and the sub-suction slit are partitioned with the first partition (160) made of a metal material, wherein the second partition is formed by a stepped surface of the suction plate and configured so that straightening of pile threads during filtration in a filtering device is delayed by suctioning liquid passing through the sub-section slit while the pile threads pass over the first and second partitions, and wherein a width of the sub-suction slit (130) being smaller than that of the main suction slit (110); and
a suction body (200) on which the suction plate (100") is mounted.

9. The suction apparatus according to claim 8, wherein the partition (160) has a stretched omega shape, and includes flanges (161) welded to inner walls of the suction body (200).

10. A suction apparatus for a fabric filter, comprising:
a suction plate forming a planar member with a predetermined thickness, the suction plate (100') having a main suction guide (140) and at least one sub-suction guide (150), which are spaced apart from each other by a predetermined distance and protrude from a surface of the suction plate so as to extend in one direction;
a suction body (200) on which the suction plate (100') is mounted; and
wherein the at least one sub-suction guide comprises two to five sub-suction guides (150) that are formed so as to be parallel to each other.

* * * * *